US008314040B2

(12) United States Patent
Smith et al.

(10) Patent No.: US 8,314,040 B2
(45) Date of Patent: Nov. 20, 2012

(54) LAMINATES OF ELASTOMERIC AND NON-ELASTOMERIC POLYOLEFIN BLEND MATERIALS

(75) Inventors: C. Allen Smith, Snellville, GA (US); Kenneth B. Close, New London, WI (US); Richard C. Beck, Solgohachia, AR (US); Jay S. Shultz, Roswell, GA (US); David J. Baer, Oshkosh, WI (US); Susan E. Shawver, Roswell, GA (US); Paul W. Estey, Cumming, GA (US); Deepak R. Parikh, Lake Jackson, TX (US); Kenneth B. Stewart, Jr., Lake Jackson, TX (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 861 days.

(21) Appl. No.: 10/706,809

(22) Filed: Nov. 12, 2003

(65) Prior Publication Data

US 2004/0192147 A1 Sep. 30, 2004

Related U.S. Application Data

(62) Division of application No. 09/511,403, filed on Feb. 21, 2000, now Pat. No. 6,680,265.

(60) Provisional application No. 60/121,066, filed on Feb. 22, 1999.

(51) Int. Cl.
*D04H 3/00* (2006.01)
(52) U.S. Cl. ......... 442/328; 442/329; 442/401; 442/400
(58) Field of Classification Search .................. 442/401, 442/328, 329, 400
See application file for complete search history.

(56) References Cited

U.S. PATENT DOCUMENTS

| | | | |
|---|---|---|---|
| 3,962,018 A | 6/1976 | Costemalle et al. | 156/306 |
| 4,226,905 A | 10/1980 | Harbourne | 428/220 |
| 4,461,872 A | 7/1984 | Su | |
| 4,526,733 A | 7/1985 | Lau | 264/12 |

(Continued)

FOREIGN PATENT DOCUMENTS

EP 0315507 10/1988

(Continued)

OTHER PUBLICATIONS

Derwent Publications, Ltd., JA 0047039, Mar. 1983.

(Continued)

*Primary Examiner* — Elizabeth Cole
(74) *Attorney, Agent, or Firm* — Dority & Manning, P.A.

(57) ABSTRACT

A nonwoven web made from a polymeric fiber blend comprising at least one elastomeric polyolefin and at least one nonelastomeric polyolefin useful as the elastic base sheet for a nonwoven laminate is disclosed. Preferably, the polymeric blend will comprise a nonelastomeric resin in the range of from about 10 to about 90 percent by weight, and an elastomeric resin of from about 90 to about 10 percent by weight. The elastomeric polyolefin will have a density of less than about 0.885 g/cm$^3$ and the nonelastomeric polyolefin will have a density of at least about 0.890 g/cm$^3$. In one particular embodiment, the polymeric blend may comprise about 50 percent to about 90 percent by weight of a narrow molecular weight distribution polyethylene and about 50 percent to about 10 percent by weight of a nonelastomeric polyolefin such as a linear low density polyethylene.

10 Claims, 1 Drawing Sheet

U.S. PATENT DOCUMENTS

| | | | | |
|---|---|---|---|---|
| RE32,028 | E | 11/1985 | Fischer | 525/194 |
| 4,626,467 | A | 12/1986 | Hostetter | 428/288 |
| 4,720,415 | A | 1/1988 | Vander Wielen et al. | 428/152 |
| 4,722,973 | A * | 2/1988 | Yamaoka et al. | 525/240 |
| 4,775,579 | A | 10/1988 | Hagy et al. | 428/284 |
| 4,804,577 | A | 2/1989 | Hazelton | 428/224 |
| 4,833,194 | A | 5/1989 | Kuan et al. | 524/525 |
| 4,891,409 | A | 1/1990 | Kuan et al. | 525/237 |
| 4,940,464 | A | 7/1990 | Van Gompel et al. | 604/396 |
| 4,990,204 | A | 2/1991 | Krupp et al. | 156/167 |
| 5,011,891 | A | 4/1991 | Spenadel et al. | 525/211 |
| 5,015,525 | A | 5/1991 | Yagi et al. | 428/364 |
| 5,071,686 | A | 12/1991 | Genske et al. | 428/35.7 |
| 5,110,685 | A | 5/1992 | Cross et al. | 428/494 |
| 5,110,870 | A | 5/1992 | Fujii | 525/194 |
| 5,116,662 | A | 5/1992 | Morman | 428/198 |
| 5,177,147 | A | 1/1993 | Spenadel et al. | 525/88 |
| 5,238,733 | A | 8/1993 | Joseph et al. | 428/284 |
| 5,241,031 | A | 8/1993 | Mehta | 526/348.1 |
| 5,250,612 | A | 10/1993 | Hazlitt | 525/53 |
| 5,266,392 | A * | 11/1993 | Land et al. | 442/400 |
| 5,272,236 | A | 12/1993 | Lai | 526/348.5 |
| 5,273,797 | A | 12/1993 | Hazelton | 428/34.7 |
| 5,278,272 | A | 1/1994 | Lai | 526/348.5 |
| 5,306,545 | A | 4/1994 | Shirayanagi | 428/198 |
| 5,319,029 | A | 6/1994 | Martin et al. | 525/240 |
| 5,322,728 | A | 6/1994 | Davey | 428/296 |
| 5,324,800 | A | 6/1994 | Welborn, Jr. et al. | 526/160 |
| 5,326,602 | A | 7/1994 | Rifi | 428/35.7 |
| 5,350,624 | A | 9/1994 | Georger et al. | 428/219 |
| 5,358,792 | A | 10/1994 | Mehta | 428/516 |
| 5,370,940 | A | 12/1994 | Hazlitt | 428/516 |
| 5,376,439 | A | 12/1994 | Hodgson | 428/220 |
| 5,378,764 | A | 1/1995 | Benham et al. | 525/240 |
| 5,382,630 | A | 1/1995 | Stehling | 525/240 |
| 5,382,631 | A | 1/1995 | Stehling | 525/240 |
| 5,385,972 | A | 1/1995 | Yamamoto | 524/579 |
| 5,393,599 | A | 2/1995 | Quantrille et al. | 428/284 |
| 5,395,471 | A | 3/1995 | Obijeski | 156/244.11 |
| 5,422,172 | A | 6/1995 | Wu | 428/230 |
| 5,451,450 | A | 9/1995 | Erderly | 428/220 |
| 5,470,639 | A | 11/1995 | Gessner | 428/152 |
| 5,472,775 | A | 12/1995 | Obijeski | 428/220 |
| 5,475,075 | A | 12/1995 | Brant | 526/348.3 |
| 5,500,260 | A | 3/1996 | Halle et al. | 428/35.7 |
| 5,539,076 | A | 7/1996 | Nowlin | 526/348.1 |
| 5,573,717 | A | 11/1996 | Peiffer | 264/45.1 |
| 5,582,923 | A | 12/1996 | Kale | 428/523 |
| 5,589,561 | A | 12/1996 | Barry | 526/348.1 |
| 5,593,747 | A | 1/1997 | Georgeios | 428/36.7 |
| 5,594,071 | A | 1/1997 | Takahashi et al. | 525/240 |
| 5,597,194 | A | 1/1997 | Daugherty et al. | 296/39.2 |
| 5,612,123 | A | 3/1997 | Gessner | 442/401 |
| 5,635,262 | A | 6/1997 | Best et al. | 428/36.92 |
| 5,733,628 | A | 3/1998 | Pelkie | |
| 6,087,429 | A | 7/2000 | Yamamoto et al. | 524/451 |
| 6,111,023 | A | 8/2000 | Chum et al. | 525/240 |
| 6,114,456 | A | 9/2000 | Dewart et al. | 525/240 |
| 6,114,457 | A | 9/2000 | Markel et al. | 525/240 |

FOREIGN PATENT DOCUMENTS

| | | |
|---|---|---|
| EP | 0600482 | 12/1993 |
| EP | 0659808 A1 | 6/1995 |
| WO | WO 93/08221 | 4/1993 |
| WO | WO 94/06857 | 3/1994 |
| WO | WO 94/07930 | 4/1994 |
| WO | WO 94/28064 | 12/1994 |
| WO | WO 95/03443 | 2/1995 |
| WO | WO 95/05418 | 2/1995 |
| WO | WO 9907788 A1 | 2/1999 |

OTHER PUBLICATIONS

Derwent Publications, Ltd., JA 0084942, May 1984.

Derwent Publications, Ltd., JO 2235947, Sep. 1990.

Hu, Yirong, et al., "Elastomeric Polypropylenes from Unbridged (2-Phenylindene)zirconocene Catalysts: Thermal Characterization and Mechanical Properties," Macromolecules, vol. 31, No. 20, 1998, U.S.A., pp. 6908-6916.

Schut, Jan H., "Compounding with Metallocene-PE Makes New Opportunities for PP," Plastics Formulating & Compounding, vol. 2., No. 2, 1996, p. 6.

Chundry, D., et al., "Metallocene-Based Polyolefin Alloys, Blends and Compounds," Plastics Formulating & Compounding, vol. 2, No. 2, 1996, pp. 18-24.

Vogel, R., et al., "Generation of Polyolefin Fiber with Higher Tenacity by Favourable Blending," Chemical Fibers International, vol. 46, 1996, pp. 421-423.

Kale, L.T., et al., "Structure-Property Relationships of Ethylene/1-Octane and Ethylene/1-Butane Copolymers Made Using Insite Technology," ANTEC, 1995, pp. 2249-2255.

Bensason, Selim, et al., "The Tensile Deformation Behavior of Homogeneous Ethylene-Octane Copolymers Produced by The Dow Constrained Geometry Catalyst Technology," ANTEC, 1995, pp. 2256-2262.

"Dow plans three-phase rollout of polyolefin 'plastomers' and elastomers," Plastics Technology, vol. 38, No. 12, 1992, p. 63.

Japanese Abstract of Patent No. JP7026079 Published Jan. 27, 1995.

* cited by examiner

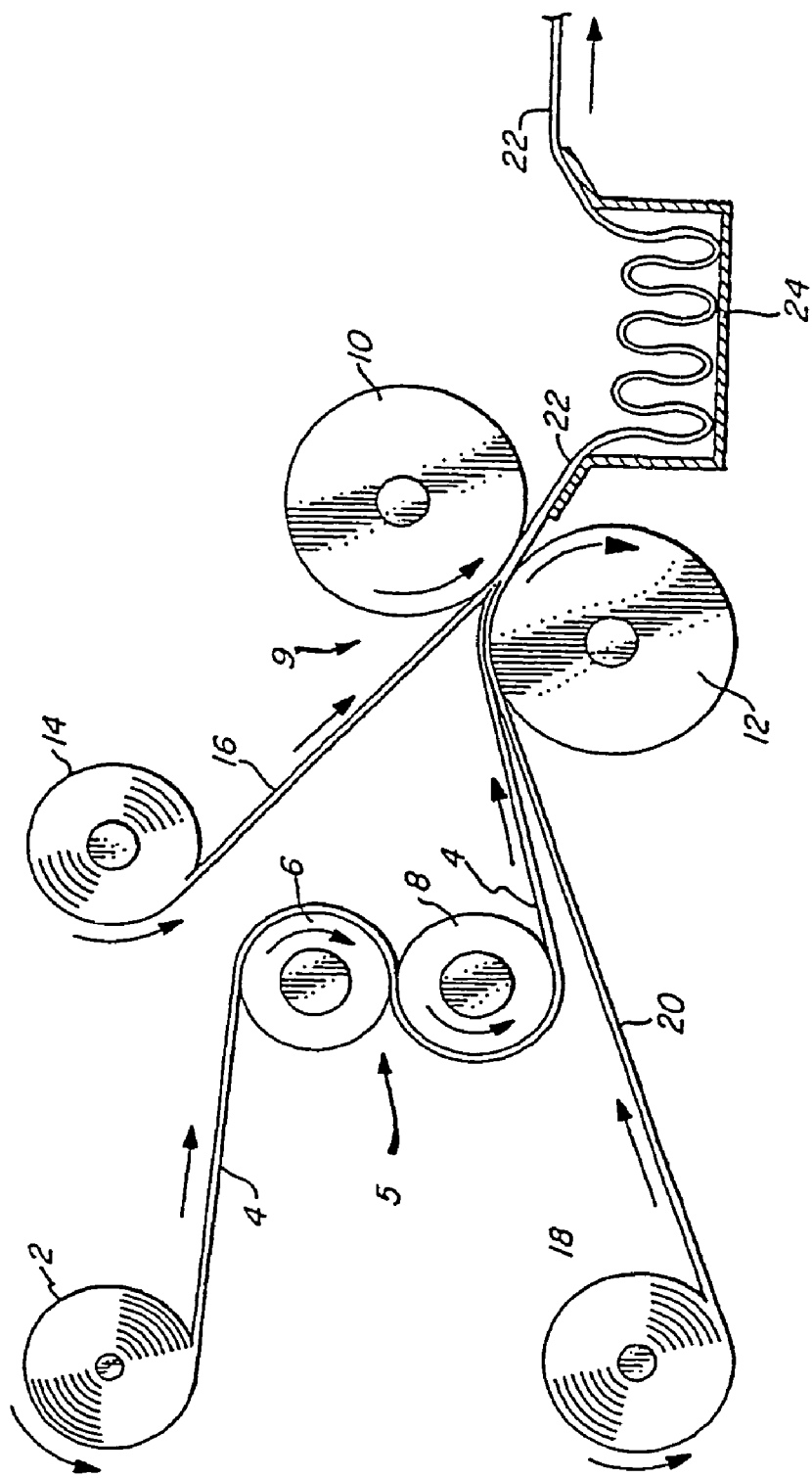

LAMINATES OF ELASTOMERIC AND NON-ELASTOMERIC POLYOLEFIN BLEND MATERIALS

CROSS REFERENCE TO RELATED PATENT APPLICATIONS

This application is a divisional of U.S. patent application Ser. No. 09/511,403, filed Feb. 21, 2000, which is a non-provisional application of U.S. provisional patent application Ser. No. 60/121,066, filed Feb. 22, 1999, and claims the priority benefit of these two applications, both of which are incorporated herein by reference in their entirety.

FIELD OF THE INVENTION

The present invention generally relates to a composite polyolefin-containing blend composition having improved physical properties. More particularly, this invention relates to a composition comprising, and a method for using, a polymeric blend of at least one elastomeric polyolefin and at least one nonelastomeric polyolefin. The composition may be used in various applications, such as substrates for nonwoven laminates.

BACKGROUND OF THE INVENTION

Polymeric blends comprising at least one elastomeric polymer and at least one nonelastomeric polymer are known in the prior art. For example, U.S. Pat. No. 4,804,577 to Hazelton et al., which is incorporated herein by reference in its entirety, discloses a nonwoven web prepared by meltblowing fibers from a polymeric blend comprised of a highly viscous elastomer with a less viscous thermoplastic resin. The webs may be used in making various clothing articles such as shoes and protective clothing as well as tarpaulins and tents. The elastomers disclosed for use in this process include polyolefin rubbers such as polyisobutylene, other olefin-rubbers, and elastomers prepared by polymerizing diolefins with various alkenyl aromatic hydrocarbons such as butadiene and styrene elastomers. The elastomeric polyolefin is present in the blend from about 5 to about 75% by weight and the thermoplastic polymeric resin is present in the blend from about 95 to about 25% by weight.

Hazelton et al. discloses that blends comprising more than about 10% by weight of the elastomeric polyolefin would be subjected to degradation prior to melt blowing. Such blends would typically exhibit viscosity above 500 poise at melt blowing conditions. Thermal and/or oxidative degradation would be performed to facilitate incorporation and dispersion of the highly viscous elastomer into the less viscous thermoplastic resin.

U.S. Pat. No. 5,597,194 to Daugherty et al. discloses a plastic net produced from a blend of plastics having different densities and peak melting points. The polymeric blend includes a polyethylene or a metallocene-catalyzed polyethylene component and a polyethylene plastomer component. The polyethylene plastomer component is formed using metallocene catalyst technology and are homopolymers of ethylene, or copolymers of ethylene with higher alphaolefins. The plastomers utilized are commercially available from Dow Plastics under various designations and trademarks such as ENGAGE and from Exxon Chemical Americas, Polymer Group under the trademark EXACT. The blend can be extruded to produce a high friction, non-slip, flexible and heat resistant plastic net that can be used as a truck bed liner.

U.S. Pat. No. 5,635,262 to Best et al., discloses articles made from a high molecular weight, high density polyethylene component and an elastomer component such as a styrenic copolymer, a rubber, or a metallocene-catalyzed polyethylene. The elastomer is present in the fabricated article from 1 to 15 weight percent. Articles include films, bags made from films, and extrusion blow-molded articles.

U.S. Pat. No. 5,110,685 to Cross et al. discloses a polymer coating consisting of a blend of high density polyethylene and ethylene/propylene rubber elastomers. U.S. Pat. No. 4,833,194 to Kuan et al. also discloses a blend of crystalline polymers such as polyethylene and elastomers such as ethylene-propylene copolymer or ethylene-propylene diene terpolymer.

Various methods and means of making and utilizing materials with elastic properties are known in the art. For example, U.S. Pat. No. 4,720,415 to Vander Wielen et al., which is incorporated herein by reference in its entirety, discloses a method of producing a composite elastic material. The method comprises stretching an elastic web, such as a nonwoven web of elastic fibers, and bonding the elongated web to one or more webs of gatherable material under conditions which soften at least a portion of the elastic web to form the bonded composite web of elastic material. The gatherable material, in one embodiment, may be a spunbonded polyester fiber material. The composite material is relaxed immediately after the bonding to prevent the elastic web from losing its ability to contract from the stretched dimensions that it assumes during the bonding step.

In one embodiment, Vander Wielen et al. utilizes polystyrene/poly(ethylene-butylene)/polystyrene block polymers that are available under the trademark KRATON from Shell Chemical Company. These KRATON rubber-type materials have been used to provide the elastic component for various articles including stretchable protective covers and wraps, outerwear, undergarments, menstrual and incontinence control articles and garments such as disposable diapers. KRATON materials are particularly useful in applications requiring a good deal of elastic memory such as baby diapers and incontinence control garments. The KRATON materials exhibit the ability to retract to near original forms after being stretched.

As indicated above, elasticity for various articles has also been provided by the metallocene-catalyzed polyethylenes. Dow Plastics, a division of Dow Chemical Company, has introduced several families of elastic polyolefins created by single-site, or constrained geometry, catalysts. For example, U.S. Pat. Nos. 5,472,775 to Obijeski et al., and 5,278,272 and 5,272,236 to Lai et al., which are incorporated herein in their entireties by reference thereto, describe various metallocene-catalyzed polyolefins produced by Dow Chemical. The materials have both plastic and rubbery characteristics.

Other companies, such as Exxon Chemicals, have also developed various processes for forming elastic polyolefins using metallocene-catalyzed synthesis. For example, U.S. Pat. No. 5,324,800 to Welborn, Jr. et al. describes several processes for forming such materials using metallocene catalysts, and is incorporated herein in its entirety by reference thereto.

When KRATON materials are used in various extrusion and meltblowing processes, flow modifiers must often be employed to relieve the intense die tip pressures that are present if only KRATON base rubber is used. For example, it is known to utilize a high melt flow polyethylene in conjunction with the KRATON base rubber in order to achieve a flowing polymer that is capable of being meltblown with conventional technologies.

In addition, problems are encountered in the prior art that employs blends of low density polyethylene with high molecular weight high density polyethylene. The differences in melt viscosity between the two polymers are such that non-homogeneity results in the melt and in the resulting film, thus leading to areas of good performance and areas of poor performance in the resulting nonwoven webs. Attempts to homogenize such mixtures to improve the dispersion and the overall physical properties have generally been unsuccessful.

The use of 100% metallocene-catalyzed polyethylene to form acceptable nonwoven webs through conventional meltblowing processes has also been tried. However, practical limitations have sometimes prevented acceptable commercial utilization of webs formed from such polymers. Due to the lower melting point of metallocene-catalyzed polyethylene (around 140° F. (60° C.)) and possibly due to the lower crystalline content, quenching is more difficult. As is known, typical meltblowing processes rely on ambient air being pulled toward the meltblowing jet to quench, and thus solidify, the meltblown fibers. Because the melting point of the metallocene-catalyzed polymers is lower, more quenching time or larger volumes of secondary air or quench water are required, thus making the entire meltblowing process more difficult and costly. Failure to properly quench or solidify the fibers will create the possibility that the webs will not release well from the wire upon which they are formed.

In addition, the use of 100% metallocene-catalyzed polymers in the meltblowing process often results in poor web formation. Due in part to the high viscosity and quenching problems discussed above, nonwoven webs formed from only elastomeric olefins, such as metallocene-catalyzed polyethylene, may be open or splotchy. In addition, the higher the viscosity of the polymer, the more difficult it is to produce small diameter microfibers which are necessary to achieve good web formation and coverage.

Another viscosity-related problem is encountered when using the more viscous metallocene-catalyzed resins. The more viscous a polymer is, the higher the pressure at the meltblowing die tip. This high die tip pressure limits the rate at which the fibers can be successfully manufactured.

Although use of the KRATON elastomers described above avoid some of the problems encountered when using 100% metallocene-catalyzed polymers, such rubber materials are extremely expensive. Typically, KRATON rubber materials will be as much as three times more expensive than comparable metallocene-catalyzed polyolefins. Although the use of KRATON materials results in webs having excellent elastic properties as well as articles having suitable "quilted" textures, the expense of such KRATON material generally prevents their use in cheaper, low end products such as wipers. Except for applications involving high end products such as diapers, the use of the KRATON materials is often inhibited because of the raw material cost involved.

There is, therefore, a need for a polyethylene composition that exhibits improved tensile strength and decreased viscosity, such that fabrication remains commercially practicable from an economic standpoint and at low elongations performed similarly. Because the metallocene-catalyzed polyolefins are much less expensive than the KRATON materials, it would be desirable to utilize the metallocene-catalyzed polyolefins over such materials.

While both polymeric blends of polyethylene and typical rubber-type elastomers and polymeric blends of various polymers and metallocene-catalyzed polyethylene are known in the art, the advantages arising from the unique combination of the present invention in the particular application as the elastic sheet(s) in various nonwoven laminates such as the stretch-bonded and neck-bonded laminates disclosed herein, have not heretofore been recognized.

SUMMARY OF THE INVENTION

The present invention recognizes and addresses the foregoing disadvantages, and others of prior art constructions and methods.

Accordingly, it is an object of the present invention to provide a polymeric composition which exhibits elastomeric properties such as flexibility and extensibility.

It is another object, of the present invention to provide a polymeric composition comprising at least one elastomeric polyolefin and at least one nonelastomeric polyolefin.

It is still a further object of the present invention to provide a polymeric composition that can be used in preparing an elastic nonwoven web that is suited for use in applications requiring increased tensile strength, decreased viscosity, and improved web formation.

It is yet another object of the present invention to provide a polymeric composition comprising a polyethylene formed using narrow molecular weight distribution elastomeric polyolefins as a first component, and a nonelastomeric polyolefin resin as a second component.

It is still a further object of the present invention to provide a polymeric composition that can be used in preparing a nonwoven web that is suited for use as an elastic sheet in various nonwoven laminate applications such as stretch- and neck-bonded laminates.

It is another object of the present invention to provide, at an economical cost, a polymeric composition that can be used in forming the elastic portions of various nonwoven materials such as wipers.

In accordance with the present invention, the foregoing and other objects and advantages are accomplished by preparing a nonwoven web from a polymeric fiber blend comprising at least one elastomeric pplyolefin and at least one nonelastomeric polyolefin.

Preferably, the polymeric blend will comprise a nonelastomeric olefin resin in the range of from about 10 to about 90 percent by weight, and an elastomeric resin of from about 90 to about 10 percent by weight. The density of the elastomeric polyolefin will be less than about 0.885 g/cm$^3$ and the density of the nonelastomeric polyolefin will be at least about 0.890 g/cm$^3$. In one particular embodiment, the polymeric blend may comprise about 50 percent to about 90 percent by weight of a metallocene-catalyzed polyethylene and about 50 percent to about 10 percent by weight of a nonelastomeric polyolefin such as a linear low density polyethylene.

The nonwoven web may be prepared using any of the methods known in the prior art, including conventional meltblowing processes. The use of a suitable lower density elastomeric resin blended with a nonelastomeric polyolefin resin of lower viscosity results in a substrate that may be advantageously meltblown into a nonwoven web. The meltblowing process utilized with the present inventive composition allows for improved web formation and lessens the quenching and die tip pressure problems associated with the use of only the higher density and more viscous elastomers.

The elastic nonwoven web formed from the present blended composition may be utilized as the elastic sheet(s) in various nonwoven laminate constructions, such as stretch-bonded and neck-bonded laminates. The elastic nonwoven web itself may be formed from various processes, including meltblowing techniques or techniques that form continuous filaments such as spunbond webs or an array of substantially parallel continuous fibers or strands. The elastic nonwoven webs of the present invention may be laminated to one or more outer layer webs. These outer layer webs may be meltblown, spunbonded, or coformed webs. In addition, such webs may be formed from continuous filaments. In one particular embodiment, the meltblown webs formed from the present elastomeric/non-elastomeric polyolefin blend is sandwiched between two outer layers of coformed webs formed from cellulosic and meltblown polypropylene fibers.

These and other features, aspects and advantages of the present invention will become better understood with reference to the following description and appended claims.

BRIEF DESCRIPTION OF THE DRAWING

A full and enabling disclosure of the present invention, including the best known mode thereof, to one of ordinary skill in the art, is set forth more particularly in the remainder of the specification, including reference to the accompanying FIGURE, which represents a schematic view in elevation illustrating one mode of forming a stretch-bonded laminate according to the present invention.

DETAILED DESCRIPTION OF THE PREFERRED EMBODIMENTS

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention.

In general, the present invention relates to nonwoven laminates wherein the elastic materials comprise a polymeric composition prepared from a blend of at least one elastomeric polyolefin and at least one nonelastomeric polyolefin, in a ratio dictated by the properties and applications desired. For example, as a meltblown substrate for a coformed stretch-bonded laminate base sheet, a one-to-one ratio of each component has been found to provide a product with improved tensile strength at 200% extension (after being extended to 250% of its original length) when compared to a product comprised solely of an elastomeric polyolefin. Other properties desired in various other laminates may require different additive ratios of the two components. For example, a 4:1 ratio of elastomeric to non-elastomeric polyolefin may provide better bonding qualities than a 1:1 ratio composition when formed into a nonwoven web.

In general, the presently disclosed elastomers may be blended with a compatible polyolefin resin and used to produce the nonwoven elastic substrate of the present invention. Various definitions have been employed to define elastomers in the past. Generally, an elastomer is defined as a substance that has the properties of a rubber such that it stretches under tension, generally has a high tensile strength, retracts rapidly, and generally recovers its original dimensions upon being released after stretching. An elastomer will typically have plastic-type traits in processing and rubber-type traits in functionality.

For purposes of the present invention, an "elastomer" or an "elastomeric polyolefin" is a polyolefin that exhibits a density of less than about 0.885 g/cm$^3$. Such polyolefins, when formed into various substrates, will be extensible or elongatable in at least one direction when a biasing force is applied, and will return to some portion of its original dimensions after the biasing force is removed. For example, elastomeric compositions, when formed into a meltblown web, will generally, but not always, have the capability of being stretched to an elongation of at least about 25% of its original relaxed length, i.e, can be stretched to at least about 1.25 times its relaxed length, and upon release of the stretching force will recover at least about 30% of the elongation, i.e., will, in the case of 25% elongation, contract to an elongation of not more than about 17.5%. For example, a 100 centimeter length of material will be deemed to be an elastomer if it can be stretched to a length of at least about 125 centimeters and if, upon release of the stretching force, it contracts, in the case of being stretched to 125 centimeters, to a length of not more than about 117.5 centimeters.

A "non-elastomer" or "non-elastomeric polyolefin" is defined for purposes of the present invention as being a polyolefin that exhibits a density of at least about 0.890 g/cm$^3$. Generally, such nonelastomeric polyolefins, when formed into a meltblown web, will, but not always, fail to meet the stretch characteristics for an elastomeric web set forth above.

As used herein, the term "nonwoven" fabric, web, or material refers to a material having a structure of individual fibers or threads that are interlaid, but not in an identifiable manner as in a knitted fabric. Nonwoven fabrics or webs have been formed by many processes such as, for example, by meltblowing processes, spunbonding processes, hydroentangling, air-laid and bonded carded web processes.

In addition, for purposes of the present invention, a "nonwoven laminate" is defined as a product which comprises two or more nonwoven webs bonded together to form a laminate. With respect to the present invention, an elastic sheet formed from the above-described elastomeric polyolefins will be bonded to at least one layer of nonwoven material. Examples of nonwoven laminates include, but are not limited to, stretch-bonded laminates and neck-bonded laminates.

"Stretch-bonded" refers to an elastic member, or layer, being bonded to another member, or layer, while the elastic member is extended at least about 25 percent of its relaxed length. "Stretch-bonded laminate" refers to a composite material having at least two layers in which one layer is a gatherable layer and the other layer is an elastic layer. The layers are joined together when the elastic layer is in an extended condition so that upon relaxing the layers, the gatherable layer is gathered. Such a multilayer composite elastic material may be stretched to the extent that the non-elastic material gathered between the bond locations allows the elastic material to elongate. One type of stretch-bonded laminate is disclosed, for example, by U.S. Pat. No. 4,720,415 to Vander Wielen et al., which has already been incorporated herein by reference. Other composite elastic materials are described and disclosed in U.S. Pat. Nos. 4,789,699 to Klaffer et al., 4,781,966 to Taylor, 4,657,802 to Morman, and 4,655,760 to Morman et al., all of which are incorporated herein by reference thereto.

"Neck-bonded" refers to an elastic member being bonded to a non-elastic member while the non-elastic member is extended or necked. "Neck-bonded laminate" refers to a composite material having at least two layers in which one layer is a necked, non-elastic layer and the other layer is an elastic layer. The layers are joined together when the non-elastic layer is in an extended condition. Examples of neck-bonded laminates are such as those described in U.S. Pat. Nos. 5,226, 992, 4,981,747, 4,965,122, and 5,336,545, all to Morman and all of which are incorporated herein by reference thereto.

"Narrow molecular weight distribution polyolefin" refers to a polyolefin that exhibits a molecular weight distribution of less than about 3.5. As is known in the art, the molecular weight distribution of a polymer is the ratio of the weight average molecular weight of the polymer to the number average molecular weight of the polymer. Methods of determining molecular weight distribution are described in the *Encyclopedia of Polymer Science and Engineering*, Volume 3, pages 299-300 (1985). Examples of narrow molecular weight distribution polyolefins include the metallocene-catalyzed polyolefins, the single-site catalyzed polyolefins, and the constrained geometry-catalyzed polyolefins described above. As is known in the art, the metallocene-catalyzed polyolefins and the constrained geometry-catalyzed polyolefins are sometimes referred to as types of single-site catalyzed polyolefins.

Typically, elastomers suitable for use in the present invention will have the capability of being stretched to at least three times their original length. When stretched to at least three times their original lengths, such elastomeric webs would typically contract to no more than two and half times their original lengths. For example, if a 10.5 centimeter web were stretched three times its original length to approximately 31.5 centimeters, it would typically retract to no more than 25 centimeters, and may typically retract to about 18 centimeters.

As the first component of the present inventive composition, an elastomeric polyolefin having a density of less than about 0.885 g/cm³ may be utilized. Although any elastomeric polyolefin may be utilized, a narrow molecular weight distribution polyolefin such as a metallocene-catalyzed polyethylene, a metallocene-catalyzed polypropylene, other metallocene-catalyzed alphaolefins, or, as discussed above, various single-site catalyzed polyolefins and constrained geometry catalyzed polyolefins may be preferred in certain embodiments. Desirably, such elastomeric polyolefins will have a density of between about 0.860 g/cm³ and about 0.880 g/cm³ and may, more desirably, have a density of between about 0.863 g/cm³ and about 0.870 g/cm³.

These elastic polyolefins, or plastomers, may utilize, for example, metallocene catalyst technology which permits precise control of the comonomer incorporated into the polyethylene polymer and of molecular weight distribution. A metallocene catalyst is a metal derivative of cyclopentadiene and the catalysis of the polymer can be described as a homogeneous single site or constrained geometry catalysis. A metallocene is a neutral, ancillary ligand stabilized transition metal complex and can have the following general formula:

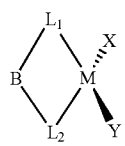

wherein:
  $L_1$ is a cyclopentadienyl or substituted cyclopentadienyl moiety bonded to the metal through η-5 bonding
  $L_2$ is an organic moiety, which may or may not be a cyclopentadienyl moiety, strongly bonded to the metal which remains bonded to the metal during polymerization
  B is an optional bridging group that restricts the movement of $L_1$ and $L_2$ and that modifies the angle between $L_1$ and $L_2$
  M is a metal such as, for instance, titanium or zirconium
  X and Y are halides or other organic moieties, such as methyl groups The metallocene complex can be shown as follows:

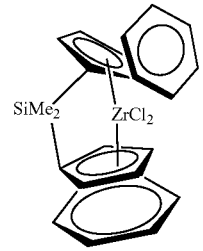

Metallocene complex acts as a catalyst that initiates polymerization of a monomer to form a polymer. For instance, in order to form a metallocene-catalyzed polymer, a liquid monomer, such as ethylene, is combined with metallocene under constant agitation and heat. Controlled amounts of hydrogen gas are then fed to the mixture to halt polymerization. In general, the amount of hydrogen gas fed to the reactor determines the melt index of the resulting polymer.

As used herein, "melt index" or "MI" refers to a measure of the viscosity of the polymer at a given set of conditions. As applied to the materials herein, the MI is expressed as the weight (or mass) of material that flows from a capillary of known dimensions under a specified load or shear rate for a measured period of time and is measured in grams/10 minutes at 190° C. and a load of 2160 grams according to, for example, ASTM test 1238.

The plastomers that may be utilized in certain embodiments of the present invention are typically homopolymers of ethylene, or copolymers of ethylene with higher alphaolefins having from 3 to about 10 carbon atoms such as 1-butene, 1-hexene, and 1-octene. Such plastomers are commercially available from Dow Plastics, Dow U.S.A., of Midland, Mich. under various product designations as well as under the trademark AFFINITY or under the trademark ENGAGE (which are Dupont Dow Elastomers, LLC.). One such suitable elastomer available commercially is a metallocene-catalyzed polyethylene sold by Dow under the product designation DOW XU58200.02. This particular elastomer has a density of about 0.870 grams/cubic centimeter (g/cm³), a melt index of about 30 grams/10 minutes, and a peak melting point of about 140° F. (60° C.). Another elastomeric plastomer is sold by Dupont Dow Elastomers, LLC. under the trademarks ENGAGE 8100 and ENGAGE 8200 which is claimed by the manufacturer to be an ethylene/1-octene copolymer. Some of the ENGAGE plastomers may have density ranges of from about 0.865 to about 0.899 g/cm³, a melt index of approximately 0.5 grams/10 minutes to about 30 grams/10 minutes, and a peak melting point range of about 120° to about 185° F. (about 490 to about 85° C.).

Other suitable plastomers are available from Exxon Chemical Americas, Polymer Group under the trademark EXACT. The EXACT plastomers, according to Exxon, have density and peak melting point ranges that are similar to the ENGAGE and AFFINITY plastomers.

As the second component of the polymer blend utilized in the present invention, a higher density, more crystalline polyolefin is utilized. These nonelastomeric olefinic polymers will have densities of at least 0.890 g/cm³. Desirably, the nonelastomeric polyolefins will have a density of between about 0.900 g/cm³ and about 0.920 g/cm³, and may more desirably have a density of between about 0.900 g/cm³ and about 0.917 g/cm³, and may even more desirably have a density of between about 0.900 g/cm³ and about 0.910 g/cm³. Polymers such as polyethylene, polybutylene, polypropylene, or other polyolefins may be utilized. Generally, the particular non-elastomeric polyolefin will be chosen based on its compatibility with the elastomeric polyolefin, and in particular based on the compatibility to a metallocene-catalyzed polymer, when such metallocene-catalyzed polymers are used. The non-elastomeric polyolefin may, for example, be linear low density, high density, or low density (including branched) polyethylene in some particular embodiments. Linear low density polyethylenes, for example, typically have densities in the range of from about 0.915 to about 0.930 g/cm³.

As can be appreciated, this second component may be variously chosen from the group consisting of polyolefin resins, including polymers of branched and straight chained olefins such as polyethylene, polypropylene, polybutylene, polypentene, polymethylpentene, and the like. The nonelastomeric polyolefins may be produced according to various processes and may even be produced according to processes similar to those described above such as metallocene-catalysis. Such higher density polyolefins can also be made by more traditional catalyst systems such as Ziegler-Natta catalysts such as described in *Encyclopedia of Polymer Science and Engineering*, Volume 8, pages 162-179 (1987). A variety of higher density polyolefins, including linear low density polyethylenes and high density polyethylenes are commercially available including those under the trade designations AFFINITY, ELITE, or ASPUN, all of which are available from Dow Chemical and those under the name EXCEED which are available from Exxon Chemical.

One particular such nonelastomeric polyolefin resin suitable in preparation of the composition of the present invention is a linear low density polyethylene available from Dow Chemical under the product designation DOW ASPUN 6831.

The non-elastomeric polyolefin, particularly if it is a polyethylene, will typically have a melt index of at least 30, with a melt index of at least 150 also being usable in the inventive blend. In addition, the non-elastomeric polyolefin, again particularly if it is a polyethylene, will have a melting temperature of at least about 100° C. (212° F.), preferably at least about 120° C. (248° F.).

Preferably, the polymeric blend will comprise from about 10 to about 90 percent by weight of the non-elastomeric resin, preferably from about 10 percent to about 75 percent by weight, more preferably from about 10 percent to about 50 percent by weight, and most preferably from about 10 percent to about 20 percent by weight. The elastomeric resin will be present in the composition from about 90 percent to about 10 percent by weight, preferably from about 90 percent to about 25 percent by weight, more preferably from about 90 percent to about 50 percent by weight, and most preferably from about 90 percent to about 80 percent by weight.

It should be understood that various other components may also be utilized in the present invention, provided that the above-described elastomeric and non-elastomeric polyolefins are present in the composition. Such other components that may be present include other polyolefin resins, surfactants, pigments, stabilizers, fillers, inorganic substances, cellulose, etc. The addition of such other components to the polymeric blend composition should not affect the characteristics achieved in the nonwoven webs formed therefrom.

In general, any of the methods known in the prior art for blending polymeric materials may be used to blend together the elastomeric resins with the nonelastomeric polyolefin resins useful in the present invention. For example, pellets of each of the materials to be premixed could be physically admixed, using suitable solid mixing equipment, and the solids mixture then passed to the extruder portion of a meltblowing apparatus. Such dry blending techniques are well known in the art.

The resins may be first physically admixed as solids in a dry blending process. They may then be fed into a meltblowing extruder. In this two-stage blending scheme, any suitable dry mixing equipment could be used for mixing, followed by the use of any suitable meltblending equipment to heat and melt the two components together. Meltblending also facilitates feeding of the blend to the meltblowing equipment.

In the particular Examples set forth below, the polymeric components were first dry blended and then provided to a meltblowing extruder without melt blending. Any required melt blending was carried out within the meltblowing extruder itself.

Processes and apparatuses employed for producing meltblown fibers and the resulting nonwoven webs are well known in the art. Meltblown fibers are fibers formed by extruding a molten polymeric material through a plurality of fine, usually circular, die capillaries as molten threads or filaments into converging, usually hot and high velocity, gas (e.g. air) streams to attenuate the filaments of molten material and form fibers. During the meltblowing process, the diameters of the molten filaments are reduced by the drawing air to a desired size. Thereafter, the meltblown fibers are carried by the high velocity gas stream and are deposited on a collecting surface to form a web of randomly disbursed meltblown fibers. Such a process is disclosed, for example, in U.S. Pat. Nos. 3,849,241 to Buntin et al., 4,526,733 to Lau, and 5,160,746 to Dodge, II et al., all of which are hereby incorporated herein by this reference. Meltblown fibers may be continuous or discontinuous and are generally smaller than ten microns in average diameter.

In a conventional meltblowing process, molten polymer is provided to a die that is disposed between a pair of air plates that form a primary air nozzle. Standard meltblowing equipment includes a die tip with a single row of capillaries along a knife edge. Typical die tips have approximately 30 capillary exit holes per linear inch of die width. The die tip is typically a 60 degree wedge-shaped block converging at the knife edge along which the capillaries are carried. The air plates in many known meltblowing nozzles are mounted in a recessed configuration such that the tip of the die is set back from the primary air nozzle. However, air plates in some nozzles are mounted in a flush configuration where the air plate ends are in the same horizontal plane as the die tip; in other nozzles the die tip is in a protruding or "stick-out" configuration so that the tip of the die extends past the ends of the air plates. Moreover, as disclosed in U.S. Pat. No. 5,160,746 to Dodge II et al, more than one airflow stream can be provided for use in the nozzle.

In most known configurations of meltblowing nozzles, hot air is provided through the primary air nozzle formed on each side of the die tip. The hot air heats the die and thus prevents the die from freezing as the molten polymer exits and cools. In this way the die is prevented from becoming clogged with solidifying polymer. The hot air also draws, or attenuates, the melt into fibers prior to exiting the nozzle.

Primary hot air flow rates typically range from about 15 to about 24 standard cubic feet per minute per inch of die width (scfm/in). Primary air pressure typically ranges from about 1 to about 10 pounds per square inch gauge (psig). Primary air temperature typically ranges from about 400° to about 600° Fahrenheit (° F.). The particular temperature of the primary hot air flow will depend on the particular polymer being drawn as well as other characteristics desired in the meltblown web.

Expressed in terms of the amount of polymer material flowing per inch of the die per unit of time, polymer throughput is typically 0.5 to 1.25 grams per hole per minute (ghm). Thus, for a die having 30 holes per inch, polymer throughput may be up to about 10 lbs/inch/hour (pih).

Moreover, in order to form meltblown fibers from an input of about five pounds per inch per hour of the polymer melt, from about fifty to about one hundred pounds per inch per hour of hot air is required to draw or attenuate the melt into discrete fibers. This drawing air must be heated to a temperature on the order of 400-600° F. in order to maintain proper heat to the die tip.

Because such high temperatures must be used, a substantial amount of heat must be removed from the fibers in order to quench (or solidify) the fibers leaving the die orifice. Cold gases, such as air, or liquids, such as water, have been used to accelerate cooling and solidification of the meltblown fibers. In particular, in U.S. Pat. No. 5,075,068 to Milligan et al and U.S. Pat. No. 5,080,569 to Gubernick et al, which are hereby incorporated herein by reference, secondary air flowing in a cross-flow perpendicular, or 90 degrees, direction relative to the direction of fiber elongation, has been used to quench meltblown fibers and produce smaller diameter fibers. In addition, U.S. Pat. No. 5,607,701 to Allen et al, which is hereby incorporated herein by reference, uses a cooler pressurized quench air that fills chamber 71 and results in faster cooling and solidification of the fibers. In U.S. Pat. No. 4,112,159 to Pall, which is hereby incorporated herein by reference, a cold air flow is used to attenuate the fibers when it is desired to decrease the attenuation of the fibers.

Through the control of air and die tip temperatures, air pressure, and polymer feed rate, the diameter of the fiber formed during the meltblown process may be regulated. For example, typical meltblown polypropylene fibers have a diameter of 3 to 4 microns. However, variations, and particularly increases, in pressure at the die tip can cause fiber diameters to fluctuate. The more viscous the flowing polymer is, the higher the die tip pressure, and the more problems associated with forming suitable fibers for nonwoven webs.

After cooling, the fibers are collected and bonded to form an integrated nonwoven web. In particular, the fibers are collected with the aid of a suction box onto a forming web that comprises a moving mesh screen or belt located below the die tip. In order to provide enough space beneath the die tip for fiber forming, attenuation and cooling, forming distances of at least about 6 to 12 inches between the polymer die tip and the top of the mesh screen are required in the typical meltblowing process, although various forming distances may be employed, depending on the particular web properties desired. For example, forming distances of up to about 18 inches are acceptable. The web possesses integrity due to entanglement of the individual fibers in the web as well as some degree of thermal or self-bonding between the fibers, particularly when collection is effected only a short distance after extrusion. In some of the Examples set forth below, typical forming distances were approximately 7 inches, and in others the forming distances were approximately 9 inches, although distances between about 6 and about 14 inches, with about 6 to about 12 inches being preferred, could have also been employed.

The web formed on the foraminous belt may be compacted or otherwise bonded by one or more rollers. From the belt, the nonwoven web may then be wound onto cores for later use or may be provided, in a continuous process, to another station for further web treatment and use.

Although conventional meltblowing apparatus have been mentioned as being useful for forming the present inventive webs, it should be understood that various other apparatuses and processes could also be utilized. For example, the meltblowing apparatus shown and described in U.S. Pat. No. 5,350,624 to Georger et al. could be used. As shown in Georger et al., which is incorporated herein in its entirety by reference thereto, two meltblowing dies 16 and 18 (as indicated in the drawings therein) may be positioned to provide polymeric filaments to the forming belt. Any number of multi-die banks of meltblowing nozzles could be utilized in forming the webs. In addition, as shown in Georger et al., additional secondary fibers may be added to the streams of polymer emanating from the two opposed meltblowing dies.

When webs having substantially continuous filaments are desired, other modified meltblowing processes may be utilized. For example, when a continuous filament web is desired, the process of forming substantially continuous polymeric filaments disclosed in U.S. Pat. No. 5,385,775 to Wright may be employed. As explained in Wright, which is incorporated herein by reference thereto, a meltblowing apparatus is utilized wherein the heat for the primary air stream flowing past the meltblowing die tip is either greatly reduced or absent. The continuous filaments are then overlayed with a type of ☐     sprayed on ☐    conventional meltblown web material. The resulting fibrous sheet exhibits substantially continuous filaments instead of the primarily randomly scattered filaments typical of most purely meltblown webs. This process can be used to form either the elastic fibrous sheets employing the present polymer blend or for forming the webs to which the elastic nonwoven webs of the present invention are laminated.

In one example of the present invention, a meltblown web having the stretchability characteristics of the present inventive composition may be formed into a stretch-bonded laminate base sheet such as described by Vander Wielen et al. which has been incorporated herein by reference. Instead of the base sheet being formed from KRATON-type materials as disclosed in Vander Wielen et al., the base sheet in the present invention is formed from the above-described elastomeric/non-elastomeric polyolefin blend. The present polymeric blend may also be formed into an elastic nonwoven web for use in a neck-bonded laminate material as previously explained.

In addition, the nonwoven webs formed from the present composition may also be utilized as the inner layer(s) for various wiper products where the outer layers of such products are coformed cellulose and polypropylene. Other applications of the present invention include various types of laminates such as nonwoven/stretchable web/nonwoven laminates, stretchable web/nonwoven/stretchable web laminates, and nonwoven/stretchable web laminates where the nonwoven portions of the laminates are typical thermoplastics nonwoven spunbond or meltblown webs and the stretchable web portions are made from the present polymeric blend material.

In forming the particular wiper products of the present invention, the polymer blend of elastomeric and non-elastomeric materials is formed into an elastic meltblown nonwoven web. This web is then heat-bonded to at least one other thermoplastic nonwoven web or a coform of approximately 65% pulp and about 35% polymer such as polypropylene. In one embodiment, the elastic nonwoven web is sandwiched between at least two outer meltblown nonwoven coformed webs. When employed, coformed webs will typically consist of cellulosic fibers and fibers formed from a polyolefin such as polypropylene or polyethylene. The inner nonwoven elastic web will be maintained in a stretched condition within its elastic range during the bonding of the outer layers to it so that upon contracting or recovering after release of the stretching, the outer layers will gather or pucker. The resulting laminate will exhibit a texture and feel of a gathered quilt-type material.

The outer layers may be webs formed by meltblowing or by spunbonding, and may, themselves, have elastic properties. The process of forming nonwoven webs by spunbonding is described in U.S. Pat. No. 4,340,563 to Appel et al., which is incorporated herein in its entirety by reference. Spunbonding techniques form small diameter fibers by extruding molten thermoplastic material as filaments from a plurality of fine, usually circular, capillaries of a spinnerette with the diameter of the extruded filaments then being rapidly reduced. Other examples of spunbonded fibers are set forth in U.S. Pat. No. 3,692,618 to Dorschner et al., U.S. Pat. No. 3,802,817 to Matsuki et al., U.S. Pat. No. 3,338,992 to Kinney, U.S. Pat. No. 3,341,394 to Kinney, U.S. Pat. No. 3,502,763 to Hartman, and U.S. Pat. No. 3,542,615 to Dobo et al. Spunbond fibers are generally continuous and have average diameters (from a sample of at least 10) larger than 7 microns, more particularly, between about 10 and 40 microns. The fibers may also have shapes such as those described in U.S. Pat. No. 5,277,976 to Hogle et al., U.S. Pat. No. 5,466,410 to Hills, U.S. Pat. No. 5,069,970 to Largman et al., and U.S. Pat. No. 5,057,368 to Largman et al., which describe fibers with unconventional shapes.

When coformed outer web layers are utilized, the coforming techniques disclosed in U.S. Pat. No. 4,100,324 to Anderson et al., which is incorporated herein in its entirety by reference, may be utilized. In particular, a coformed nonwoven web is formed by combining in a gas stream a mixture of meltblown thermoplastic and cellulosic fibers such as wood pulp or staple fibers. In the technique disclosed therein, the thermoplastic and cellulosic fibers are combined prior to the combined fibers being collected on a forming wire to form a coherent web of randomly dispersed fibers. A typical coformed nonwoven web may comprise about 65% by weight cellulosic fibers and about 35% by weight thermoplastic fibers, although this ratio may be varied to achieve various desirable properties in such coformed webs. When the present resulting laminate is formed, the laminate may comprise about 50% by weight synthetic fibers and about 50% by weight cellulosic fibers, with other ratios also being suitable.

Suitable apparatus for forming such coformed webs includes the device shown in Georger et al. which is discussed and incorporated by reference above.

Referring now to the FIGURE, a manufacturing process for heat-bonding gatherable outer layers to each of the two opposite sides of a stretched elastic web is illustrated. It will be appreciated that both in-line and off-line processes could be utilized in manufacturing the present materials. The conversion of in-line to off-line processes, and vice versa is well within the skill of those in the art.

An elastic inner web 4 which may be formed from the presently-described elastomeric/non-elastomeric polyolefin blend is unwound from a supply roll 2 of such elastic material. The elastic inner web 4 then travels in the direction indicated by the arrows and passes through the nip of S roll arrangement 5 which is comprised of stacked rollers 6 and 8 in the reverse-S path indicated by the rotation direction arrows associated with stacked rollers 6 and 8. From S roll arrangement 5, web 4 passes into the pressure nip of a bonder roll arrangement 9, which is comprised of a patterned calender roller 10 and a smooth anvil roller 12.

A first gatherable web 16 is unwound from a supply roll 14 and a second gatherable web 20 is unrolled from a supply roll 18. First web 16 and second web 20 travel in the direction indicated by the arrows associated therewith as supply rolls 14 and 18 rotate in the directions indicated by the respective arrows. Elastic web 4 is stretched to a desired percent elongation between S roll arrangement 5 and the pressure nip of bonder roll arrangement 9. By virtue of the fact that the peripheral linear speed of the rollers of S roll arrangement 5 is controlled to be less than the peripheral linear speed of the rollers of bonder roll arrangement 9, elastic web 4 is therefore stretched to a selected percent elongation and maintained in such elongated condition during heat-bonding of the webs 16 and 20 to the elastic web 4 in bonder roll arrangement 9.

One or both of patterned calender roller 10 and smooth anvil roller 12 may be heated and the pressure between these two rollers may be adjusted by well-known means to provide the desired temperature and bonding pressure to bond the webs 16 and 20 to the elastic web 4 to form composite laminate material 22.

Upon emerging from the pressure nip of bonder roll arrangement 9, composite laminate material 22 may be passed to an optional holding box 24 wherein it is maintained in a relaxed, unstretched condition for a length of time sufficient for elastic web 4 to cool. Cooling while in a stretched condition should be substantially avoided so that the elastic web's ability to contract from the stretched dimensions which it had assumed during bonding will be maintained. If maintained under tension at or above its softening temperature for long periods of time, the webs would lose their ability to contract to or return to its original unstretched dimensions. A brief recovery period in a relaxed, untensioned condition immediately after bonding allows lower basis weight elastic webs to contract and gather the outer gatherable webs so that the bonded web retains some of its elasticity. After a brief untensioned recovery period of, for example, up from about 3 to about 30 seconds in holding box 24, composite laminate material 22 is withdrawn for winding up on a storage roll (not shown). The holding box 24, or other equivalent means, allows the untensioned heat-bonded composite laminate to stabilize, or cool, while it is in an untensioned arrangement, allowing the elastic web 4 to contract and gather the outer gatherable webs 16 and 20 immediately after all the webs are bonded together.

Conventional drive means may be Utilized in the apparatus of the FIGURE. Such means are well known and have not been shown for purposes of clarity in the schematic. In addition, various bonding patterns (embossing patterns) may be utilized on the calender roller. Such bonding techniques are also well known in the art.

The nonwoven laminates formed with the present elastomeric/non-elastomeric polyolefin blend are an economic alternative to the laminates employed in Vander Wielen et al. and in other processes which generally employ the more expensive KRATON-type materials. Articles such as wipers and cloths where elastic memory is not as important as economical manufacture may utilize the present technology beneficially. The present process provides a means to form these lower cost, lower performing laminates, while maintaining the desired bulk, texture, and appearance. The use of the blend also has several processing advantages over the use of 100% metallocene-catalyzed elastomeric polyolefins such as better wire release and the providing of better fiber coverage in the formed web.

The following examples are meant to be exemplary procedures only which aid in the understanding of the present invention. The invention is not meant to be limited thereto.

EXAMPLES 1-43

In the Examples summarized in Tables 1-4 below, the superiority of a blend of elastomeric and non-elastomeric polyethylene as a meltblown elastic substrate for various products such as a coformed stretch laminate base sheet is shown. The use of the polyethylene blend yields a product with a dramatic improvement in tensile strength and a reduction in viscosity. This results in a decreased die tip pressure and melting temperature during the meltblowing process, as compared to the control product consisting solely of an elastomeric polyolefin.

All of the Examples 1-43 are nonwoven meltblown elastic webs spun with a basis weight of 30 grams per square meter (GSM). All of the Examples 1-43 were extruded from a dry blends mixture where appropriate, using a polymer flow rate of 1.0 lbs/inch/hour (pih).

Table 1 compares various characteristics of the webs of Examples 1-13, composed solely of a metallocene-catalyzed elastomeric polyolefin (DOW XU58200.02), which serves as a control.

Table 2 summarizes Examples 14-25, comprised of a 50/50 blend of elastomeric polyolefin (DOW XU58200.02) and nonelastomeric polyolefin resin (DOW ASPUN 6831).

Table 3 summarizes Examples 26-34, blended from 75%, by weight, elastomeric resin (DOW XU58200.02) and 25%, by weight, linear low density polyethylene resin (DOW ASPUN 6831). Table 4 summarizes Examples 35-43, comprising a polymer blended from 90%, by weight, elastomeric resin (DOW XU58200.02) and 10%, by weight, linear low density polyethylene resin (DOW ASPUN 6831).

For each of the Examples, Melt Temperature (Melt Temp) in degrees Fahrenheit (° F.), Primary Air Temperature (° F.), Primary Air Flow (Ft$^3$/M), and load at 2.5× and 2.0× is detailed. The load at 2.5× was determined by quantifying the load required to stretch the polymeric web to 2.5 times its original length. A spring-type hanging scale was used to quantify the weight. The load at 2.0× was determined by relaxing the polymer web, already having been stretched to 2.5 times its original length, to 2 times its original length.

The results summarized in Tables 2, 3, and 4 demonstrate that the polymer blends support a significant increase in tensile load at 2.5×, as compared to the control meltblown shown in Table 1.

Table 5 demonstrates the difference in Spin Pump Pressure and Melt Pressure at the die inlet between meltblown substrates comprised of 100% metallocene-catalyzed elastomers (DOW XU58200.02) and those blended from a 50/50 ratio of elastomeric polyolefin to nonelastomeric polyolefin resin (DOW XU58200.02/DOW ASPUN 6831). In addition, Table 5 indicates the fact that the dual meltblowing die arrangement described in Georger et al. was utilized. The column entitled "Die #" identifies the particular die of the two with which the accompanying data is associated. As indicated on the Table, each example listed employed the same polymeric formulation in both of the dies.

Results in Table 5 show that the Melt Pressure at the die inlet required to extrude the 100% metallocene-catalyzed elastomer (DOW XU58200.02) was significancy higher than that required for the 50/50 blend (DOW XU58200.02/DOW ASPUN 6831). The lower die tip pressure required by the 50/50 blend provides a commercial advantage over the higher die tip pressure required by the 100% metallocene-catalyzed polyethylene elastomer.

TABLE 1

| Example | Melt Temp (° F.) | Primary Air Temp (° F.) | Primary Air Flow (cfm) | Load @ 2.5X (lbs) | Load @ 2.0X (lbs) |
| --- | --- | --- | --- | --- | --- |
| 1  | 420 | 450 | 280 | 4.2  | 0.8 |
| 2  | 420 | 480 | 330 | 12.0 | 3.5 |
| 3  | 420 | 510 | 380 | 8.5  | 2.8 |
| 4  | 450 | 510 | 280 | 14.0 | 4.0 |
| 5  | 450 | 480 | 380 | **   | **  |
| 6  | 450 | 450 | 330 | 10.8 | 3.2 |
| 7  | 480 | 450 | 380 | 8.0  | 2.0 |
| 8  | 480 | 480 | 280 | 14.3 | 4.3 |
| 9  | 480 | 510 | 330 | 12.5 | 3.5 |
| 10 | 480 | 480 | 246 | 14.2 | 4.0 |
| 11 | 480 | 480 | 289 | 14.5 | 4.2 |
| 12 | 480 | 480 | 318 | 13.8 | 4.0 |
| 13 | 480 | 480 | 344 | 11.0 | 2.0 |

** This web would not release from the forming wire

TABLE 2

| Example | Melt Temp (° F.) | Primary Air Temp (° F.) | Primary Air Flow (cfm) | Load @ 2.5X (lbs) | Load @ 2.0X (lbs) |
| --- | --- | --- | --- | --- | --- |
| 14 | 420 | 450 | 280 | 18.0 | 2.3 |
| 15 | 420 | 480 | 380 | 23.0 | 4.4 |
| 16 | 420 | 510 | 380 | 22.5 | 4.5 |
| 17 | 450 | 510 | 280 | 24.5 | 4.8 |
| 18 | 450 | 480 | 380 | 26.4 | 5.0 |
| 19 | 450 | 450 | 330 | 23.5 | 4.7 |
| 20 | 480 | 450 | 380 | 25.3 | 4.4 |
| 21 | 480 | 480 | 280 | 23.3 | 4.5 |
| 22 | 480 | 510 | 330 | 26.8 | 4.7 |
| 23 | 450 | 480 | 380 | *** | *** |
| 24 | 450 | 480 | 380 | *** | *** |
| 25 | 450 | 480 | 380 | *** | *** |

*** Missing data point

TABLE 3

| Example | Melt Temp (° F.) | Primary Air (° F.) | Primary Air Temp Flow (cfm) | Load @ 2.5X (lbs) | Load @ 2.0X (lbs) |
| --- | --- | --- | --- | --- | --- |
| 26 | 420 | 450 | 280 | 29.0 | 8.0 |
| 27 | 420 | 480 | 330 | 24.7 | 6.7 |
| 28 | 420 | 510 | 380 | 21.2 | 6.7 |
| 29 | 450 | 510 | 280 | 24.8 | 6.2 |
| 30 | 450 | 480 | 380 | 20.5 | 5.5 |
| 31 | 450 | 450 | 330 | 22.0 | 6.0 |
| 32 | 480 | 450 | 380 | 22.2 | 6.0 |
| 33 | 480 | 480 | 280 | 26.8 | 6.2 |
| 34 | 480 | 510 | 330 | 24.0 | 5.8 |

TABLE 4

| Example | Melt (° F.) | Primary Air Temp (° F.) | Primary Air Temp Flow (cfm) | Load @ 2.5X (lbs) | Load @ 2.0X (lbs) |
| --- | --- | --- | --- | --- | --- |
| 35 | 420 | 450 | 280 | 21.7 | 6.4 |
| 36 | 420 | 480 | 330 | 16.7 | 5.0 |
| 37 | 420 | 510 | 380 | 13.7 | 4.5 |

TABLE 4-continued

| Example | Melt (° F.) | Primary Air Temp (° F.) | Primary Air Temp Flow (cfm) | Load @ 2.5X (lbs) | Load @ 2.0X (lbs) |
|---|---|---|---|---|---|
| 38 | 450 | 510 | 280 | 19.5 | 6.2 |
| 39 | 450 | 480 | 380 | 16.3 | 5.0 |
| 40 | 450 | 450 | 330 | 16.5 | 5.3 |
| 41 | 480 | 450 | 380 | 15.3 | 5.0 |
| 42 | 480 | 480 | 280 | 21.7 | 6.2 |
| 43 | 480 | 510 | 330 | 19.3 | 5.3 |

TABLE 5

| Example | Die # | Polymer Type | Hose Temp (° F.) | Spin Pump Temp (° F.) | Adapter Temp (° F.) | Spin Pump Pressure (psi) | Melt Pressure (Die Inlet) (psi) |
|---|---|---|---|---|---|---|---|
| 1 | 1 | 100% 58200.02 | 420 | 420 | 420 | 1124 | 600 |
|  | 2 | 100% 58200.02 | 420 | 420 | 420 | 1290 | 600 |
| 4 | 1 | 100% 58200.02 | 450 | 450 | 450 | 880 | 490 |
|  | 2 | 100% 58200.02 | 450 | 450 | 450 | 1014 | 461 |
| 7 | 1 | 100% 58200.02 | 480 | 480 | 480 | 801 | 484 |
|  | 2 | 100% 58200.02 | 480 | 480 | 480 | 888 | 443 |
| 14 | 1 | (50/50) 58200.02/6831 | 420 | 420 | 420 | 555 | 358 |
|  | 2 | (50/50) 58200.02/6831 | 420 | 420 | 420 | 727 | 364 |
| 18 | 1 | (50/50) 58200.02/6831 | 450 | 450 | 450 | 468 | 310 |
|  | 2 | (50/50) 58200.02/6831 | 450 | 450 | 450 | 569 | 293 |
| 21 | 1 | (50/50) 58200.02/6831 | 480 | 480 | 480 | 440 | 311 |
|  | 2 | (50/50) 58200.02/6831 | 480 | 480 | 480 | 536 | 300 |

EXAMPLES 44-62

The following Table 6 sets forth additional elastomeric polyethylene/nonelastomeric polyethylene blends that were utilized in forming elastic meltblown sheets for use in various nonwoven laminates. The particular elastomeric polyethylenes were the DOW-brand elastomerics referred to earlier. Densities, melt indices, and amounts by weight of the two components are indicated. Table 7 indicates various processing conditions at which the meltblown sheets were formed and the relevant processing conditions at which the meltblown sheets were bonded to polypropylene facing material to form laminates. Table 8 sets forth the results of peak strain percent, percent set and percent hysteresis (during the first and the fifth stretching cycles) of meltblown webs formed from the various blends shown in Table 6. Finally, Table 9 sets forth the results of melt temperature, percent stretch to stop, percent set, and percent hysteresis (during the first and the fifth stretching cycles) when the elastic webs formed as indicated in Table 6 were utilized in forming a stretch-bonded polypropylene laminate as described above.

Equilibrium hysteresis testing was performed by cycling a sample web between zero and a predetermined cycle elongation for a predetermined number of cycles. This cycle testing was used to determine % stretch, % set, and % hysteresis for the various samples running at 20 inches per minute as a test speed.

For purposes of these examples, "stretch" is a measurement of the difference between an elastic material's extended and unextended length in a particular dimension. The "stretch %" is determined by determining that difference and then dividing by the elastic material's unextended length in that same dimension (and then multiplying by 100% to obtain a percentage).

"Set" is a measurement of the amount a material is stretched from its original length after being cycled. The remaining strain after the removal of the applied stress is measured as the "% set". Percent set is where the retraction curve of a cycle crosses the elongation axis. Tension set gives a measure of the irreversibility of deformation.

"Hysteresis" is a measurement of the amount of energy loss within a specific cycle. The loading and unloading energy are calculated by integrating the area under the respective curves using the Trapezoidal rule. The percent hysteresis of a cycle is defined as:

$$\% \text{ Hysteresis} = \frac{\text{Loading Energy} - \text{Unloading Energy}}{\text{Loading Energy}} \times 100$$

"Melt temperature" of the meltblown webs are shown as the range of melt temperatures at which the particular samples were produced.

Where data is missing from the tables, no data was recorded for that particular entry.

TABLE 6

| Example | Elastomeric MI | Elastomeric Density (g/cm$^3$) | Elastomeric Amount (% by weight) | Nonelastomeric MI | Nonelastomeric Density (g/cm$^3$) | Elastomeric Amount (% by weight) |
|---|---|---|---|---|---|---|
| 44–48 | 30 | 0.870 | 90% | 30 | 0.902 | 10% |
| 49–52 | 30 | 0.870 | 95% | 30 | 0.902 | 5% |
| 53–55 | 14 | 0.863 | 90% | 30 | 0.902 | 10% |

TABLE 6-continued

| Example | Elastomeric MI | Elastomeric Density (g/cm³) | Elastomeric Amount (% by weight) | Nonelastomeric MI | Nonelastomeric Density (g/cm³) | Elastomeric Amount (% by weight) |
|---|---|---|---|---|---|---|
| 56–59 | 14 | 0.863 | 80% | 30 | 0.902 | 20% |
| 60–63 | 14 | 0.863 | 80% | 30 | 0.886 | 20% |

TABLE 7

| Example | On Wire Basis Weight (osy) | Forming Distance (inches) | Meltblowing Air Temperature (° F.) | Meltblowing Primary Air Flow (psi) | Bonding Temperature (° F.) Anvil/Pattern | Polymer Melt Temperature (° F.) | Forming Wire Speed to Bonder Speed Ratio |
|---|---|---|---|---|---|---|---|
| 44 | 2.1 | 9 | 410 | 2.2 | 153/156 | 392 | .30 |
| 45 | 2.0 | 9 | 413 | 1.7 | 150/150 | 364 | .38 |
| 46 | 2.0 | 9 | 413 | 1.7 | 150/150 | 420 | .39 |
| 47 | 2.0 | 9 | 413 | 1.7 | 150/150 | 420 | .26 |
| 48 | 2.1 | 9 | 413 | 1.7 | 149/151 | 433 | .45 |
| 49 | 2.0 | 9 | 451 | 1.4 | 148/150 | 417 | .24 |
| 50 | approx. 1.0 | 9 | 453 | 1.4 | 147/150 | 414 | .33 |
| 51 | 2.0 | 9 | 450 | 1.8 | 149/151 | 396 | .28 |
| 52 | 2.0 | 9 | 450 | 1.8 | 147/151 | 375 | .34 |
| 53 | 2.0 | 9 | 494 | 2.4 | 148/152 | 425 | .38 |
| 54 | 2.0 | 9 |  | 2.4 | 148/152 |  | .22 |
| 55 | 2.0 | 9 | 500 | 2.5 | 148/151 | 445 | .21 |
| 56 | 2.0 | 9 | 499 | 1.8 | 151/151 | 438 | .22 |
| 57 | 2.0 | 9 | 500 | 1.7 | 149/149 | 414 | .21 |
| 58 | 2.0 | 9 | 500 | 1.7 | 151/151 | 399 | .22 |
| 59 | 2.0 | 9 | 504 | 1.6 | 150/149 | 448 | .26 |
| 60 | 2.0 | 9 | 504 | 1.7 | 150/149 | 454 | .28 |
| 61 | 2.0 | 9 | 503 | 1.7 | 151/151 | 436 | .28 |
| 62 | 2.0 | 9 | 502 | 1.7 | 150/148 | 412 | .26 |
| 63 | 2.0 | 9 | 501 | 1.7 | 151/151 | 386 | .28 |

TABLE 8

| Example (Meltblown Sheet) | Peak Strain % | % Set | % Hysteresis (Cycle 1) | % Hysteresis (Cycle 5) |
|---|---|---|---|---|
| 44 | 274 | 53.06 | 63.0 | 46.4 |
| 45 | 258 | 55.73 | 64.7 | 47.2 |
| 46 | 312 | 55.36 | 64.1 | 47.0 |
| 47 |  |  |  |  |
| 48 | 204 | 55.58 | 64.8 | 47.5 |
| 49 | 229 | 52.06 | 63.1 | 46.2 |
| 50 | 276 | 54.20 | 62.6 | 46.7 |
| 51 | 324 | 50.72 | 62.5 | 46.2 |
| 52 | 325 | 49.88 | 62.1 | 45.8 |
| 53 | 344 | 42.81 | 56.5 | 42.4 |
| 54 |  |  |  |  |
| 55 | 328 | 42.40 | 57.4 | 42.7 |
| 56 | 389 | 50.70 | 61.7 | 44.3 |
| 57 | 390 | 49.58 | 60.8 | 44.2 |
| 58 | 412 | 50.67 | 62.1 | 44.8 |
| 59 | 345 | 53.40 | 63.6 | 45.6 |
| 60 | 343 | 47.05 | 58.9 | 44.5 |
| 61 | 337 | 46.53 | 59.2 | 44.6 |
| 62 | 408 | 45.78 | 58.8 | 44.3 |
| 63 | 444 | 44.99 | 57.8 | 44.1 |

TABLE 9

| Example (Stretch-Bonded Laminate) | % Stretch | % Set | % Hysteresis (Cycle 1) | % Hysteresis (Cycle 5) |
|---|---|---|---|---|
| 44 | 107.7 | 13.89 | 45.9 | 42.4 |
| 45 | 82.71 | 10.34 | 38.4 | 38.6 |
| 46 | 86.56 | 9.94 | 39.5 | 39.7 |
| 47 | 101.90 | 14.17 | 45.8 | 43.1 |
| 48 | 74.80 | 9.15 | 36.3 | 37.9 |
| 49 | 102.85 | 14.56 | 46.9 | 44.7 |
| 50 | 81.99 | 11.12 | 41.0 | 41.6 |
| 51 | 116.53 | 15.35 | 46.5 | 44.0 |
| 52 |  |  |  |  |
| 53 | 105.18 | 13.80 | 38.5 | 39.1 |
| 54 | 136.35 | 19.58 | 47.8 | 42.9 |
| 55 | 130.88 | 16.99 | 45.9 | 42.2 |
| 56 | 115.56 | 16.00 | 46.9 | 42.1 |
| 57 | 120.24 | 18.10 | 48.8 | 43.3 |
| 58 | 118.31 | 18.29 | 49.3 | 43.4 |
| 59 | 119.23 | 18.97 | 49.2 | 43.6 |
| 60 | 119.99 | 15.02 | 44.5 | 41.6 |
| 61 | 117.24 | 14.84 | 44.5 | 41.6 |
| 62 | 110.99 | 13.53 | 42.3 | 39.8 |
| 63 | 108.84 | 13.95 | 41.7 | 40.2 |

The elastic webs summarized in the above examples could be utilized as the stretchable material layer in various known products such as described above. One such example would be the stretch-bonded laminate material described above. Another example would be neck-bonded laminates. Other examples would be the utilization of the present polymeric blend in various continuous filament applications to form elastic fibrous sheets that could be employed in various laminates and products.

A further benefit of utilizing the present inventive composition is that releasing of the nonwoven web from the wire does not become an issue. Because of the higher melting temperature of the blend as opposed to the 100% metallocene-catalyzed polyethylene web, the nonwoven webs formed from the blends released more readily from the forming screens and were less likely to adhere.

The present webs may be used in various other applications where laminates may be typically employed. For example, any laminates that are used in materials to provide body conformance (i.e., to allow "give" without rupturing) would be suitable products to manufacture from the present webs. Examples of such products include personal care absorbent products such as training pants, diapers, and other incontinence products, as well as protective workwear such as industrial coveralls and surgical gowns. Other products include various garments such as undergarments, pants, shirts, jackets, gloves, socks, and the like. Such products and their manufacturing techniques are well known in the industry.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention, which is set forth in the following claims. In addition, it should be understood that aspects of the various embodiments may be interchanged both in whole or in part. For example, while a meltblown substrate for a coform stretch laminate base sheet has been exemplified, other uses are contemplated. Therefore, the spirit and scope of the appended claims should not be limited to the description of the preferred versions contained therein.

What is claimed is:

1. An elastic nonwoven web comprising fibers formed from a composition having a blend of two components wherein one of said two components comprises an elastomeric polyolefin having a density of about 0.865 g/cm$^3$ to about 0.889 g/cm$^3$ and a peak melting point range of about 49° C. to about 85° C. and the other of said two components comprises a nonelastomeric polyolefin having a density of at least 0.890 g/cm$^3$ and a melt index of at least 30, wherein said elastomeric polyolefin component is present in said composition in an amount of from about 90% to about 50% and said nonelastomeric polyolefin component is present in said composition in an amount of from about 10% to about 25%.

2. The nonwoven web of claim 1 wherein said elastomeric polyolefin has a molecular weight distribution of less than about 3.5.

3. The nonwoven web of claim 1 wherein said elastomeric polyolefin is a polyethylene having a molecular weight distribution of less than about 3.5.

4. The nonwoven web of claim 3 wherein said nonelastomeric polyolefin is a polyethylene.

5. The nonwoven web of claim 1, wherein the elastomeric polyolefin component is present in the composition in an amount from about 80% to about 90% and the non-elastic polyolefin is present in the composition in an amount from about 10% to about 20%.

6. The nonwoven web of claim 1, wherein the nonwoven web comprises a meltblown web.

7. The nonwoven web of claim 1, wherein the nonwoven web comprises a spunbond web.

8. The nonwoven web of claim 1, wherein the fibers comprise substantially continuous filaments.

9. The nonwoven web of claim 8, wherein the substantially continuous filaments comprise an array of substantially continuous filaments.

10. the nonwoven web of claim 8, wherein the substantially continuous filaments comprise spunbond fibers.

* * * * *